(12) United States Patent  (10) Patent No.: US 8,585,131 B2
Rawlinson et al.  (45) Date of Patent: Nov. 19, 2013

(54) REAR VEHICLE TORQUE BOX

(75) Inventors: Peter Dore Rawlinson, Playa Del Rey, CA (US); Hitendra Laxmidas Gadhiya, Irvine, CA (US); Alexi Charbonneau, Hermosa Beach, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 69 days.

(21) Appl. No.: 13/341,615

(22) Filed: Dec. 30, 2011

(65) Prior Publication Data

US 2012/0169089 A1   Jul. 5, 2012

Related U.S. Application Data

(60) Provisional application No. 61/430,108, filed on Jan. 5, 2011, provisional application No. 61/430,562, filed on Jan. 7, 2011, provisional application No. 61/430,565, filed on Jan. 7, 2011.

(51) Int. Cl.
  *B62D 25/08* (2006.01)
(52) U.S. Cl.
  USPC ............. 296/187.11; 296/193.08; 296/203.04

(58) Field of Classification Search
  USPC ............. 296/187.11, 193.01, 193.08, 203.01, 296/203.04, 209
  See application file for complete search history.

(56) References Cited

U.S. PATENT DOCUMENTS

| | | | |
|---|---|---|---|
| 5,320,403 A | 6/1994 | Kazyak | |
| 5,468,018 A | 11/1995 | Redman et al. | |
| 6,227,322 B1 * | 5/2001 | Nishikawa | 180/68.5 |
| 6,450,567 B2 | 9/2002 | Toba et al. | |
| 6,568,747 B2 | 5/2003 | Kobayashi | |
| 6,834,910 B2 | 12/2004 | Wendland et al. | |
| 7,273,247 B2 * | 9/2007 | Grueneklee et al. | 296/205 |
| 7,905,541 B2 | 3/2011 | Yamaguchi et al. | |
| 8,033,596 B2 * | 10/2011 | Neumann et al. | 296/193.08 |

* cited by examiner

*Primary Examiner* — Glenn Dayoan
*Assistant Examiner* — Jason S Daniels
(74) *Attorney, Agent, or Firm* — J. Richard Soderberg (57) ABSTRACT

A rear structure for a vehicle is provided, the structure including (i) a pair of single piece rear torque boxes; (ii) a pair of rocker panels mechanically coupled to the rear torque boxes; (iii) a pair of rear rails mechanically coupled to the rear torque boxes; and (iv) at least one cross-member interposed between and mechanically coupled to the rear torque boxes.

18 Claims, 13 Drawing Sheets

REAR VEHICLE TORQUE BOX

CROSS-REFERENCE TO RELATED APPLICATION

The present application claims benefit of the filing date of U.S. Provisional Patent Application Ser. Nos. 61/430,108, filed 5 Jan. 2011, 61/430,562, filed 7 Jan. 2011, and 61/430,565, filed 7 Jan. 2011, the disclosures of which are incorporated herein by reference for any and all purposes.

FIELD OF THE INVENTION

The present invention relates generally to vehicle structures and, more particularly, to rear vehicle structures that simplify vehicle manufacturing while achieving enhanced performance.

BACKGROUND OF THE INVENTION

In designing a vehicle's rear structure, an automotive designer must take into account a variety of often competing goals and constraints. Exemplary design goals include providing an adequate, if not spacious, rear compartment, providing a spare tire compartment, achieving the desired performance characteristics for the car (e.g., desired dynamic bending and torsional rigidity characteristics), providing mounting structures for vehicle cross-members and floor paneling, and achieving a reasonable level of protection to the vehicle's occupants during a rear collision. At the same time, the designer must also achieve a relatively lightweight structure in order to minimize its impact on the vehicle's MPG or $MPG_{equivalent}$, and a structure that is easy to fabricate and assemble, thus maintaining low manufacturing cost.

One attempt of at least achieving some of these design goals is disclosed in U.S. Pat. No. 6,834,910, issued 28 Dec. 2004. As disclosed, a Y-shaped rear brace is included in the vehicle's rear structure, the Y-brace helping to achieve the desired level of static and dynamic bending and torsional rigidity while adding minimal weight to the vehicle. In at least one of the disclosed embodiments, the location of the Y-brace leaves an indentation for a spare tire.

U.S. Pat. No. 5,468,018, issued 21 Nov. 1995, discloses a rear torque box assembly that includes two interconnected box members that are mounted between the vehicle's side rails and body side sills. The design of this assembly provides torsional stiffness while providing support for a rear suspension trailing link. An alternate rear torque box design is disclosed in U.S. Pat. No. 5,320,403, issued 14 Jun. 1994.

It is therefore an object of the present invention to provide a simplified vehicle rear torque box structure that is easy to manufacture, lightweight, provides mounts for the rear vehicle structures without the use of additional reinforcements, and achieves the desired torsional and rigidity characteristics.

SUMMARY OF THE INVENTION

The present invention provides a rear vehicle structure that includes (i) a pair of single piece rear torque boxes; (ii) a pair of rocker panels, where the first rear torque box is mechanically coupled (e.g., welded) to the left hand rocker panel and the second rear torque box is mechanically coupled (e.g., welded) to the right hand rocker panel; (iii) a pair of rear rails, where the first rear torque box is mechanically coupled (e.g., welded) to a first portion of the left hand rocker panel and the second rear torque box is mechanically coupled (e.g., welded) to a first portion of the right hand rocker panel; and (iv) at least one cross-member interposed between and mechanically coupled to (e.g., welded) the first and second rear torque boxes. The torque boxes may be cast, for example using a low pressure permanent mold and an internal sand core, and fabricated from aluminum, an aluminum alloy or steel. The rear torque boxes may each include a plurality of integral vehicle seat mounts. Each rear rail may be comprised of a polygonal-shaped upper hollow channel and a polygonal-shaped lower hollow channel, where the upper and lower channels share a common wall. The polygonal-shaped upper and lower hollow channels of the rear rails may utilize a regular or non-regular octagon-shaped structure, or a regular or non-regular hexagon-shaped structure, and may be fabricated from an aluminum extrusion, an aluminum alloy extrusion or a steel extrusion. The left hand and right hand rear rails may each have a cross-sectional height at least 2 times their cross-sectional width. The end portions of the rear rails, distal from the end portions coupled to the rear torque boxes, may be mechanically coupled to a rear vehicle body panel or to the rear vehicle bumper. The structure may include a battery pack enclosure mounted between and mechanically coupled to the left and right hand rocker panels. The battery pack enclosure, which may be substantially airtight and fabricated from aluminum, an aluminum alloy or steel, includes a top panel, a bottom panel and a plurality of side members. The battery pack enclosure may also include a plurality of battery pack cross-members that traverse the distance between enclosure side members adjacent to the left and right hand rocker panels, and that segregate the batteries into groups of batteries.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries electrically interconnected to achieve the desired voltage and capacity for a particular application. The batteries of the battery pack are contained within a single piece or multi-piece housing referred to herein as a battery pack enclosure, and often referred to herein as simply the "battery pack". The term "electric vehicle" as used herein refers to either an all-electric vehicle, also referred to as an EV, a plug-in hybrid vehicle, also referred to as a PHEV, or a hybrid vehicle, also referred to as a HEV, a hybrid vehicle utilizing multiple propulsion sources one of which is an electric drive system.

Figure 1:
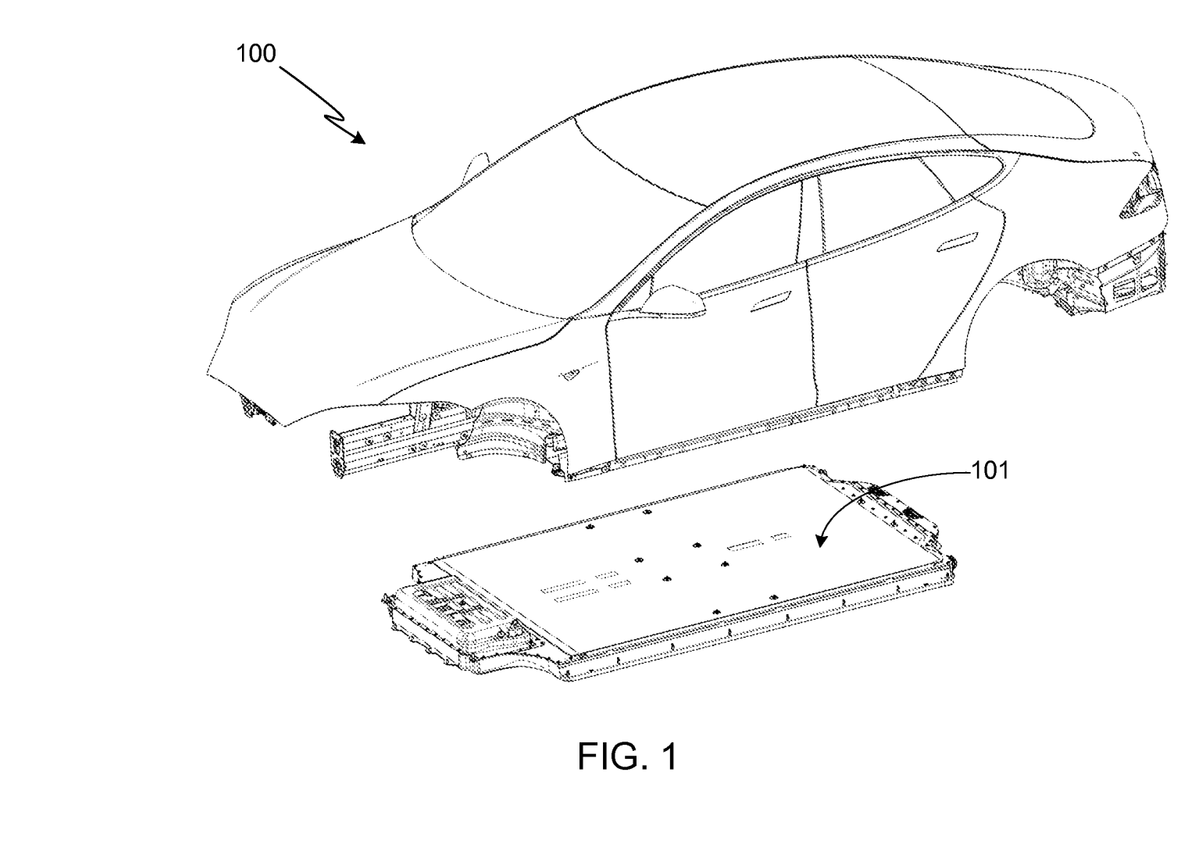
FIG. 1 provides a perspective view of a portion of a vehicle body and frame with the battery pack separated from the structure.
Figure 2:
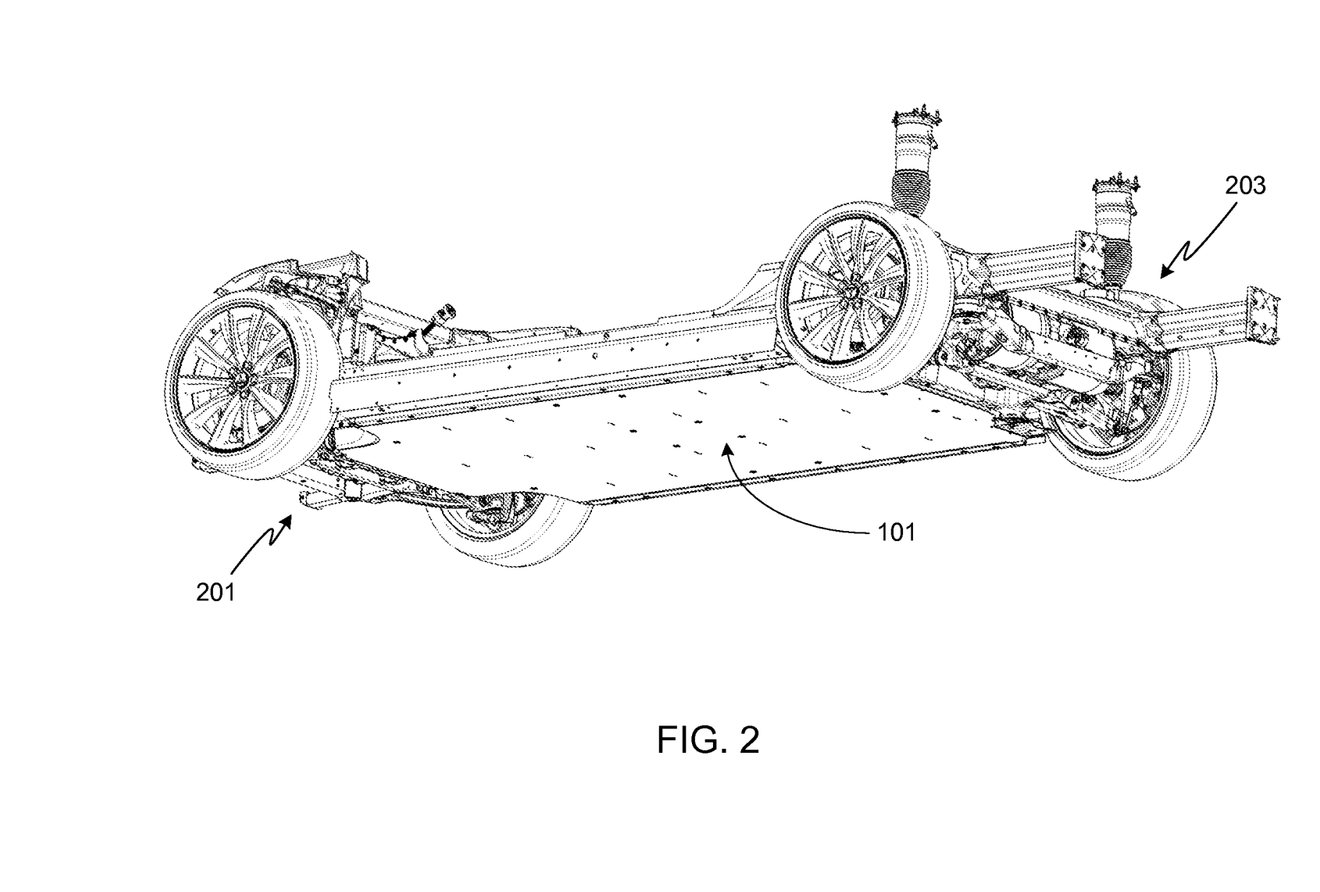
FIG. 2 provides a perspective view of a vehicle's undercarriage with the battery pack of FIG. 1 incorporated into the vehicle structure.
Figure 3:
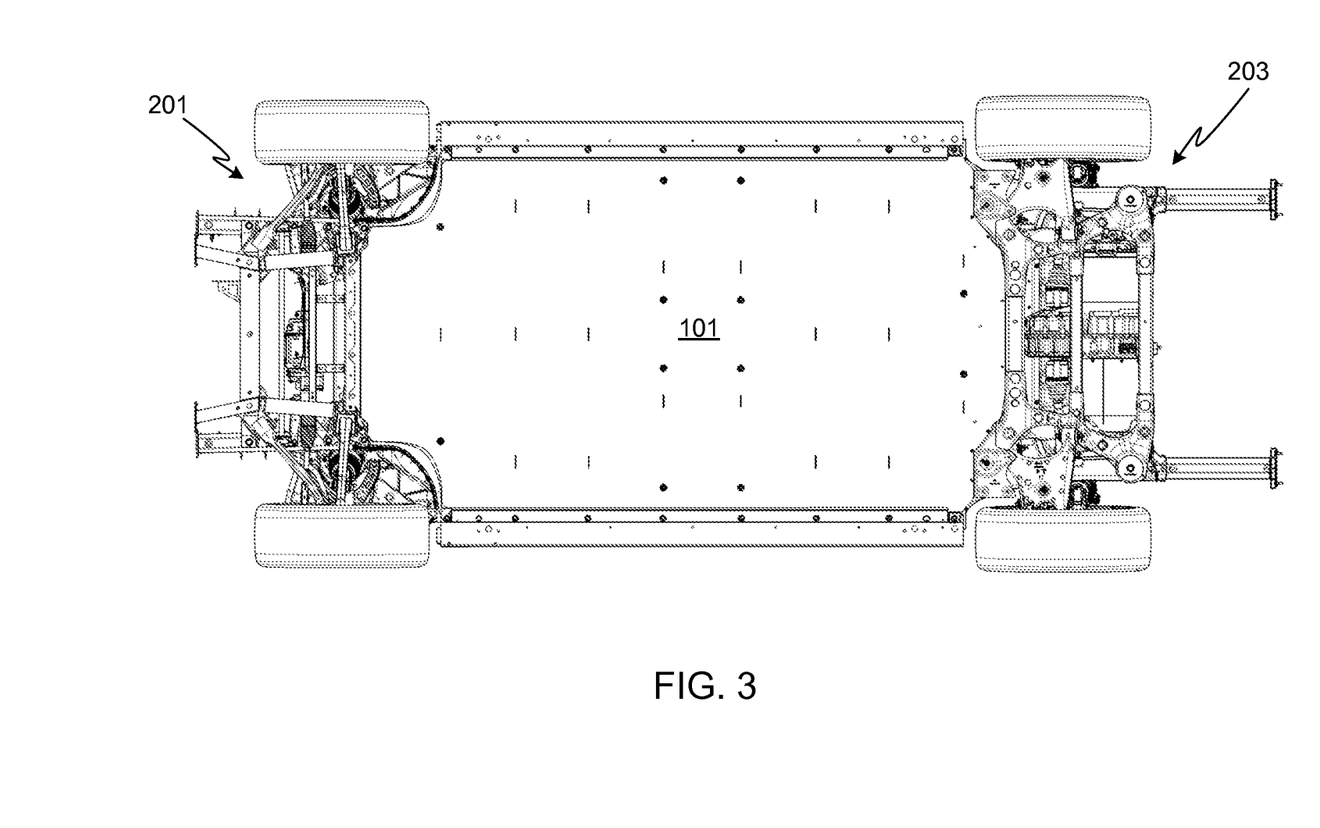
FIG. 3 provides a simplified bottom view of an electric vehicle's undercarriage with the battery pack of FIG. 1 incorporated into the vehicle structure.

The present invention provides a pair of rear vehicle torque boxes, each comprised of a single piece, which provide superior vehicle manufacturability and performance. Although the torque boxes of the invention may be used in both electric vehicles and conventional vehicles, in general they have been optimized to achieve peak performance in an electric vehicle, and in particular in an electric vehicle in which a large battery pack enclosure is integrated into the vehicle's frame as illustrated in FIGS. 1-3. As shown, battery pack enclosure 101 is mounted to the undercarriage of a vehicle 100 and attached to the body sub-frame as well as the front and rear suspension sub-frames. Preferably and as shown, battery pack enclosure 101 transverses the width of the vehicle, i.e., from rocker panel to rocker panel, and extends between the front suspension 201 and the rear suspension 203. In the illustrated embodiment, battery pack 101 is approximately 2.7 meters long and 1.5 meters wide. The thickness of battery pack enclosure 101 varies from approximately 0.1 meters to 0.18 meters, the thicker dimension corresponding to those portions of the battery pack in which battery modules are positioned one on top of another.

Figure 4:
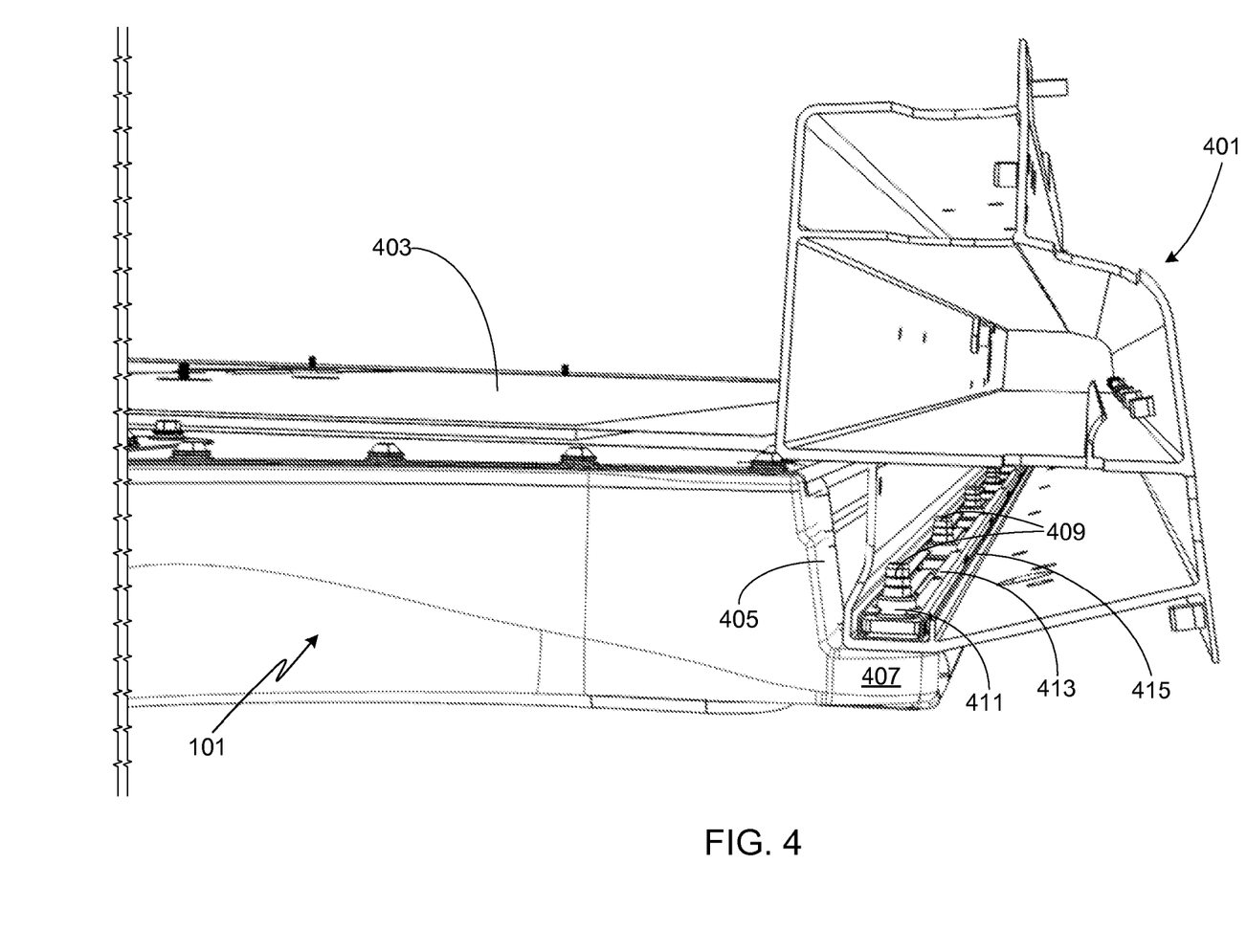
FIG. 4 provides a perspective view of a battery pack to rocker panel assembly.

As noted above, preferably battery pack 101 is configured to transverse the width of the vehicle and be coupled to the rocker panels located on either side of the vehicle. FIG. 4 illustrates an exemplary technique for attaching battery pack 101 to rocker panel 401, this figure showing the location of battery pack 101 under vehicle floor panel 403. Preferably rocker 401 is extruded, for example using an aluminum or aluminum alloy extrusion as described in detail in co-pending U.S. patent application Ser. No. 13/308,206, filed 30 Nov. 2011, and attached to the battery pack as described in co-pending U.S. patent application Ser. No. 13/308,300, filed 30 Nov. 2011, the disclosures of which are incorporated herein for any and all purposes. In general and as illustrated for the preferred embodiment, battery pack enclosure 101 includes side members 405 that include a mounting flange. In the illustrated embodiment, the mounting flange is an extended mounting region 407 that is positioned under rocker 401. Region 407 is perforated in order to allow passage of a plurality of mounting bolts 409. Mounting bolts 409, in combination with nuts 411, mechanically couple extended region 407 of battery pack 101 to rocker 401. To simplify assembly, channel nuts 411 are held in place during vehicle assembly using a channel nut retainer 413. Retainer 413 is positioned within rocker 401 using internal feature 415, thereby simplifying vehicle assembly and reducing manufacturing costs. It will be understood that other techniques may be used to mount the battery pack under the vehicle's floor panel.

Figure 5:
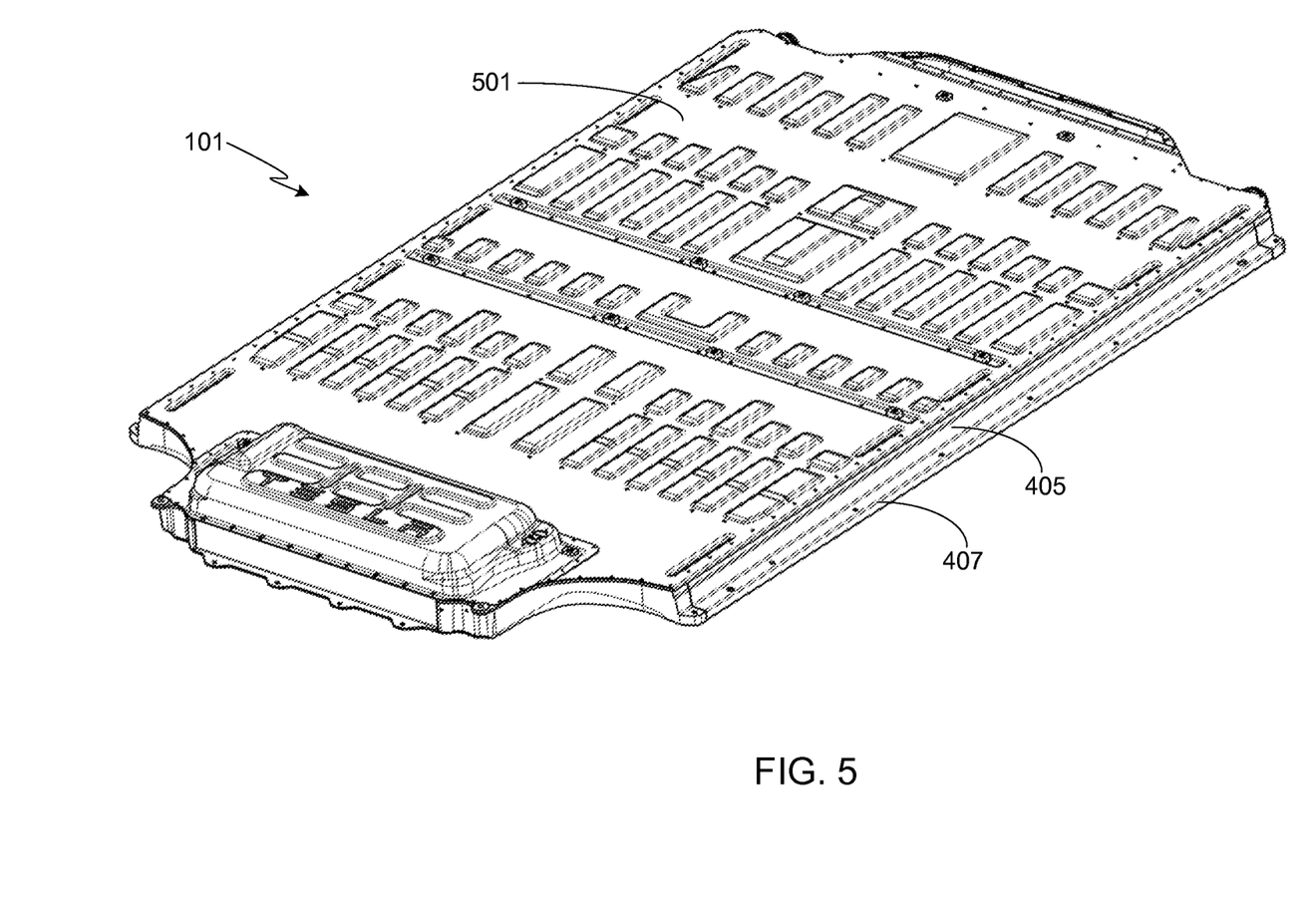
FIG. 5 provides a perspective view of the battery pack shown in FIGS. 1-4.
Figure 6:
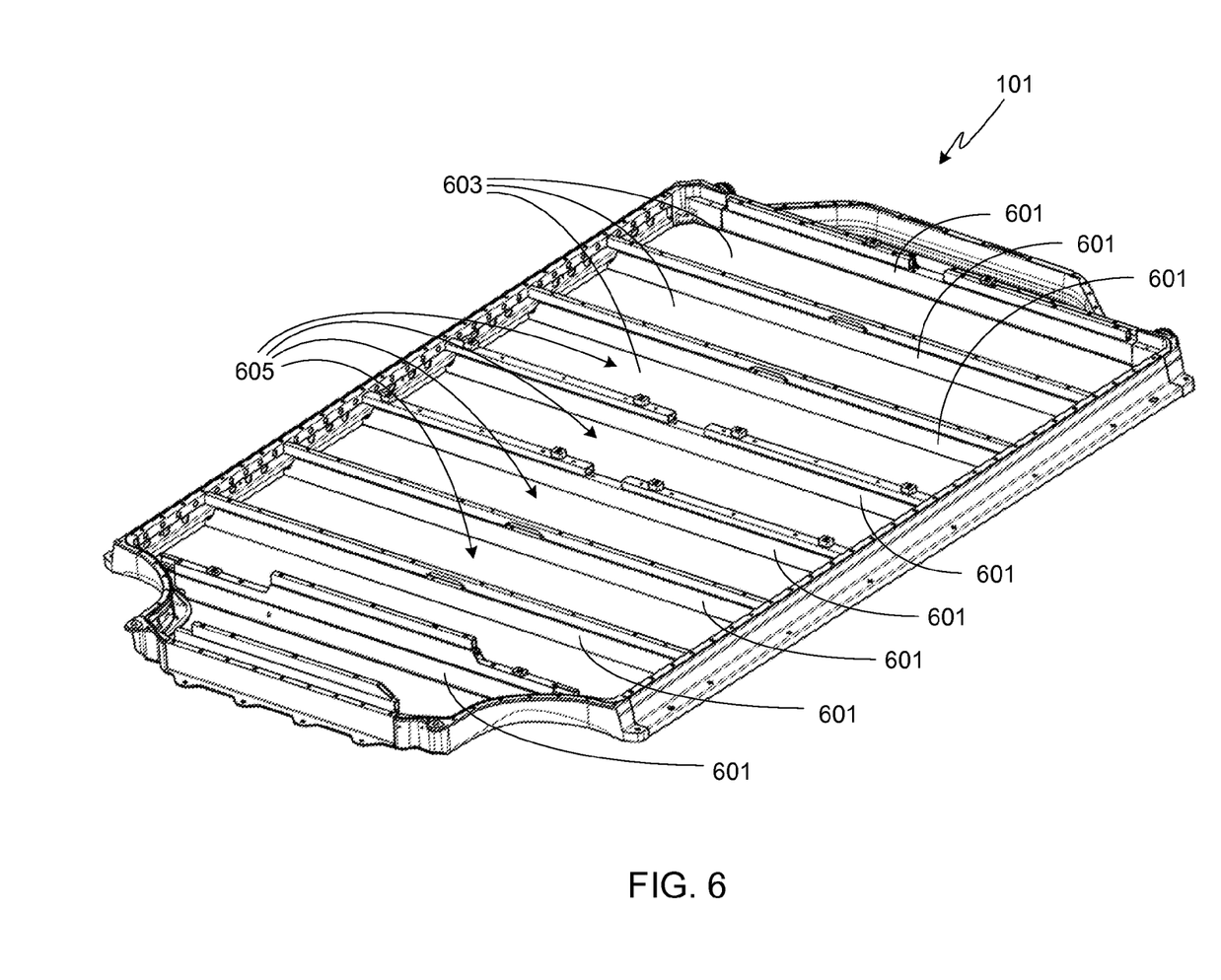
FIG. 6 provides a perspective view of the battery pack shown in FIGS. 1-5, with the top panel removed.

FIG. 5 provides a perspective view of battery pack enclosure 101 with the top enclosure panel 501 in place, panel 501 preferably providing a substantially airtight seal. Hollow side structural elements 405 are also visible, members 405 preferably including an extended region or flange 407 that is used to mechanically and thermally couple the side members 405 to the vehicle structure (not shown in this figure). FIG. 6 shows battery pack 101 with top member 501 removed, this view showing cross-members 601. The number of cross-members is based on the number of cells/cell modules that are to be contained within the battery pack while the dimensions of individual cross-members are based on the desired structural characteristics of the battery pack enclosure. Preferably battery pack side members 405, including extended region 407, battery pack top panel 501 and battery pack bottom panel 603 are each fabricated from a light weight metal, such as aluminum or an aluminum alloy, although other materials such as steel may be used for some or all of the battery pack components. Bottom panel 603 may be welded, brazed, soldered, bonded or otherwise attached to side members 405, with the resultant joint between panel 603 and member 405 preferably being substantially air-tight as well as being strong enough to allow bottom panel 603 to support the batteries contained within the pack. Top panel 501 is typically attached to member 405 using bolts or similar means, thus simplifying battery replacement as well as allowing battery interconnects, battery pack components, cooling system components and other battery pack components to be repaired and/or replaced.

Cross-members 601 provide several benefits. First, members 601 provide mechanical and structural strength and rigidity to the battery pack enclosure as well as to the vehicle to which the battery pack is attached. Second, members 601 help to segregate thermal events by providing a thermal barrier between groups of cells as well as minimizing gas flow between sections 605, sections 605 being defined by the cross-members, side members 405, top member 501 and bottom member 603. By segregating thermal events within smaller groups of cells, thermal runaway propagation is limited as is the potential for battery pack damage.

Figure 7:
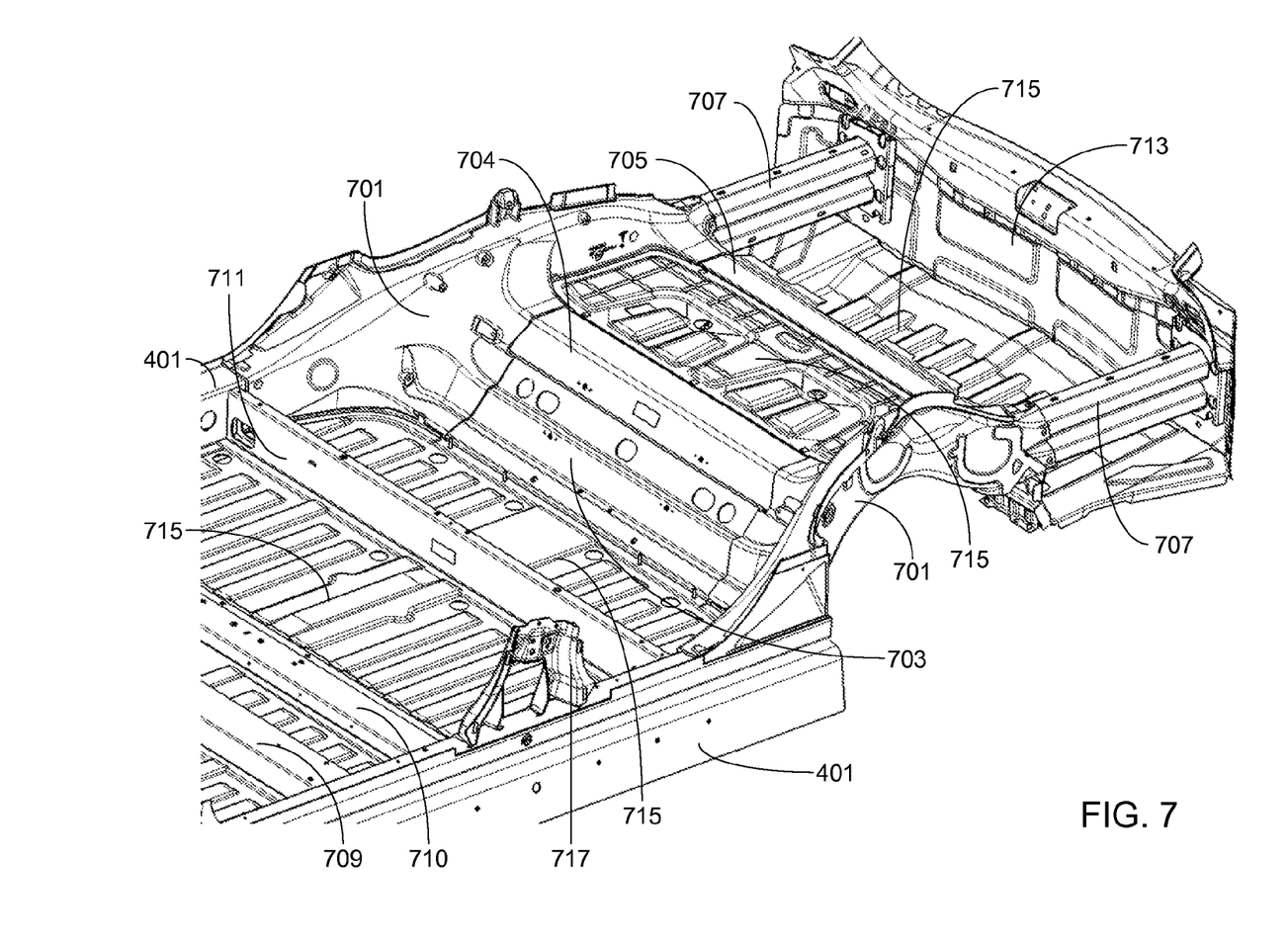
FIG. 7 provides a perspective view of the primary components of the rear section of an exemplary vehicle.
Figure 8:
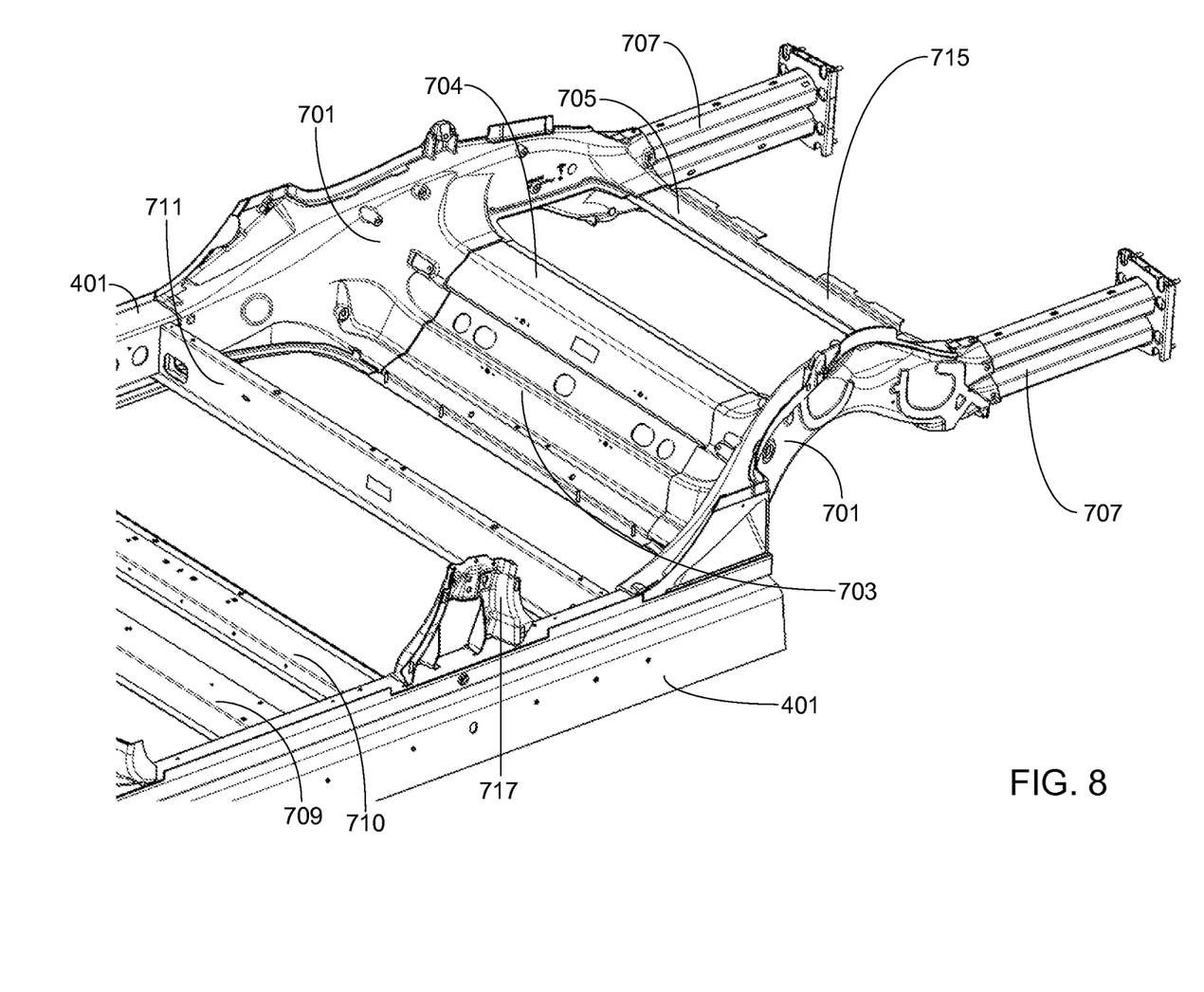
FIG. 8 provides a simplified view of the assembly shown in FIG. 7, this view eliminating the rear and bottom panels.

FIG. 7 provides a perspective view of the primary components of the rear section of an exemplary vehicle, e.g., vehicle 100. In this view, rear torque boxes 701 are visible, the torque boxes being coupled to rocker panels 401, multiple cross-members 703-705, and rear rails 707. Several body cross-members 709-711 are also visible as are the rear vehicle panels 713. Multiple floor panels 715 are visible as is one of the B-pillar mounts 717. FIG. 8 provides the same view of the vehicle as that of FIG. 7, except that several components have been removed to simplify the figure. Specifically, in FIG. 8 the rear and bottom panels 713 and 715, respectively, have been eliminated from view.

Figure 9:
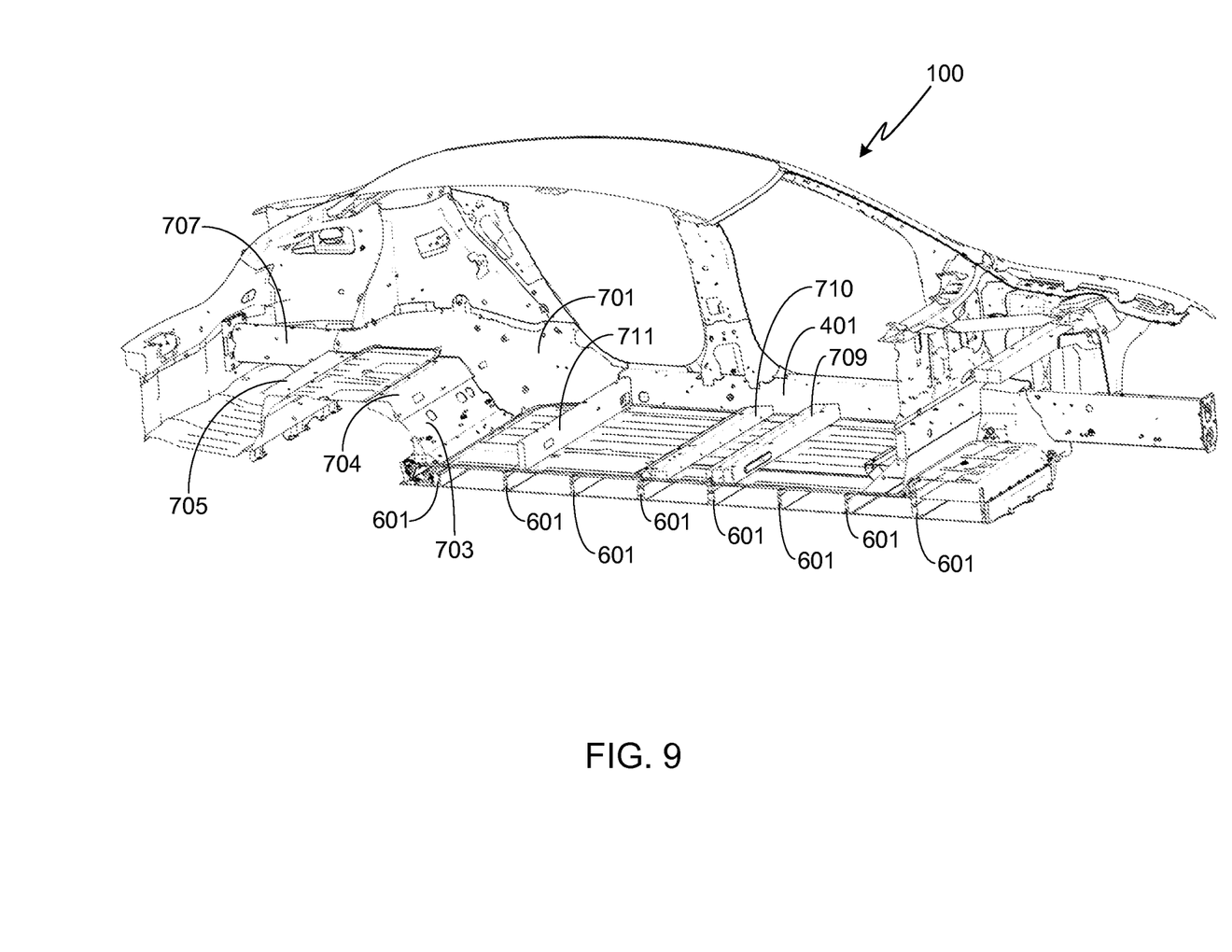
FIG. 9 provides a perspective, cross-sectional view of the vehicle shown in FIG. 1 that illustrates the integration of the rear torque box into the vehicle.

FIG. 9 provides a prospective, cross-sectional view of vehicle 100, this view showing the integration of a single piece rear torque box 701 in accordance with the invention. This view also provides additional views of the cross-members, both cross-members 601 within the battery pack 101 and the body cross-members 709-711. Note that in this figure the batteries/battery modules are not shown within the battery pack, thus simplifying the figure in order to better illustrate the basic battery pack/vehicle assembly and configuration.

As shown in the cross-sectional view of FIG. 9, preferably battery pack cross-members 601 do not utilize the same cross-section; rather the cross-section of each is optimized for that particular member's location within the pack. In general, battery pack cross-members 601 may either be comprised of a single unit or as preferred, comprised of an upper section and a lower section, thus providing a convenient means of capturing and mounting the batteries/battery modules within the pack. One or both sections of each cross-member may be hollow, thus minimizing weight while still providing a rigid and strong structural member. It should be understood that not only can the configuration/design of the cross-members vary, depending upon their location within the pack, so can the materials comprising the cross-members. Therefore while cross-members 601 are preferably fabricated from aluminum or an aluminum alloy, for example using an extrusion process, other materials (e.g., steel, ceramics, etc.) may also be used if such materials fit both the mechanical and thermal goals for the particular cross-member in question. Additionally, the lumens within one or more of the cross-members may be unfilled or filled, for example filled with a high melting temperature, low thermal conductivity material (e.g., fiberglass or similar material). Alternately, the lumens within the cross-members may include a liquid (e.g., water), the liquid being either stagnant or flowing. If stagnant, the liquid may be contained within the lumens themselves or, as preferred, contained within pouches that fit within the cavities. If the liquid is flowing, it is preferably contained within tubing that is inserted within the cross-member cavities and either coupled to a battery cooling system or used in a stand-alone circulation system.

Preferably and as illustrated in FIG. 9, the battery pack cross-members within the central region of the pack are larger than the other cross-members. The reason for the increased size for these particular cross-members is to provide additional cross-member strength at those locations that are both used for seat mounting assemblies and are considered critical to resisting side impact loads that may be encountered during a collision.

Figure 10:
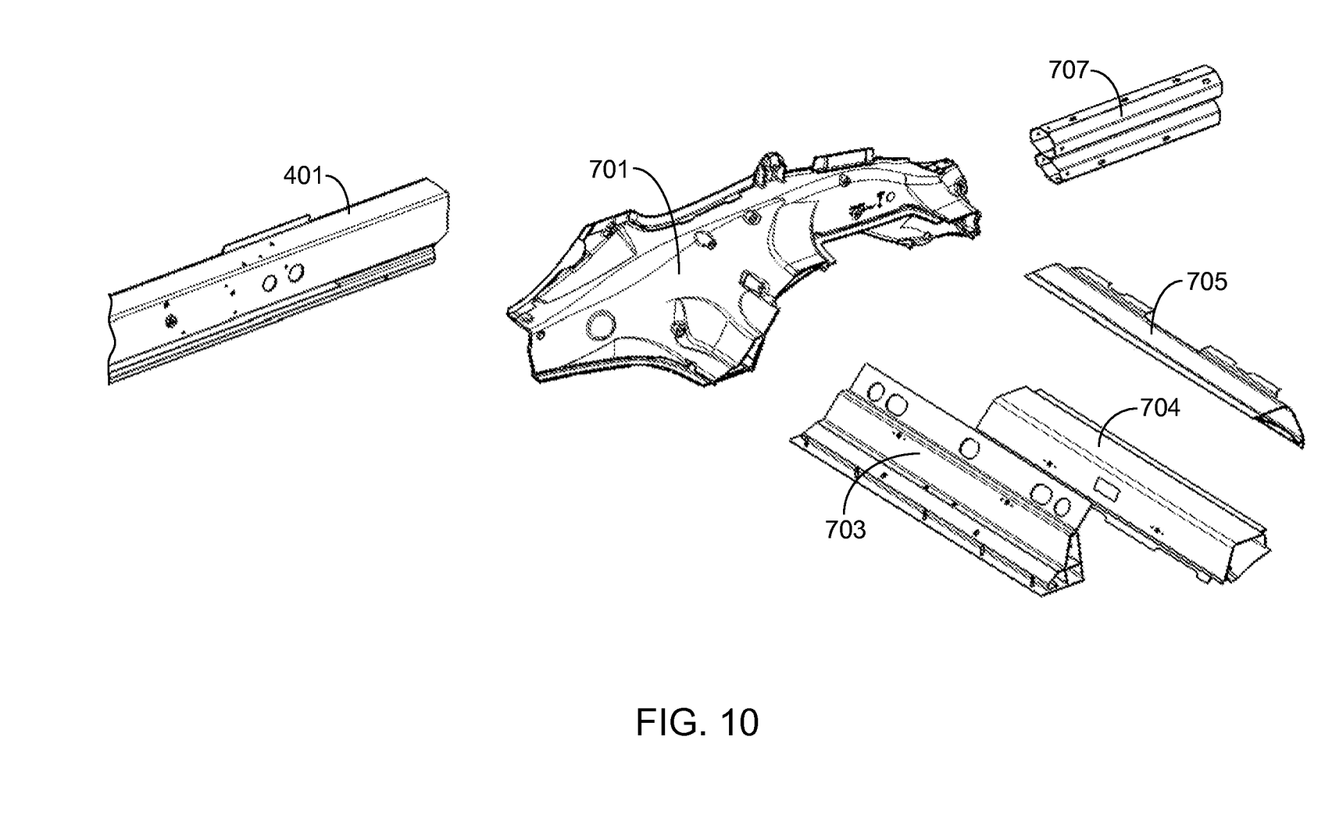
FIG. 10 provides a perspective, exploded view of the rear torque box and the primary structural elements that are coupled to the rear torque box.

FIG. 10 provides an exploded view of the single piece torque box 701 of the invention with the vehicle structural elements that are mechanically coupled to the torque box in the preferred embodiment. As shown and as noted above, torque box 701 is mechanically coupled to rocker panel 401, also referred to herein as a sill or side sill, along with cross-members 703-705 and rear rails 707. In the preferred embodiment the vehicle's rear torque boxes 701, side sills 401, cross-members 703-705 and rear rails 707 are each fabricated from aluminum or an aluminum alloy, although other materials (e.g., steel) may be used for some or all of these components. Preferably sill 401, cross-members 703-705 and rear rail 707 are each welded to the single piece torque box.

In the preferred embodiment and as illustrated in the accompanying figures, the vehicle rear rails 707, which couple the rear torque boxes 701 to the rear panel of the vehicle and preferably to the rear vehicle bumper, are comprised of a pair of multi-walled channels that share a common wall. In at least some embodiments, and as shown, each channel is comprised of a regular or non-regular, octagon-shaped structure. It will be appreciated that other polygonal-shaped structures may be used for each channel of the rear rails, e.g., a regular or non-regular hexagon-shaped structure may be used. The multi-walled channel shape provides strength and rigidity in a relatively low-weight structure. Vehicle rear rails 707 are preferably fabricated from aluminum or an aluminum alloy using an extrusion process, although other materials and fabrication processes may be used. Typically the double polygonal-shaped structure has a height of 200 millimeters or less, a width of 100 millimeters or less, and a wall thickness of between 2-4 millimeters.

Figure 11:
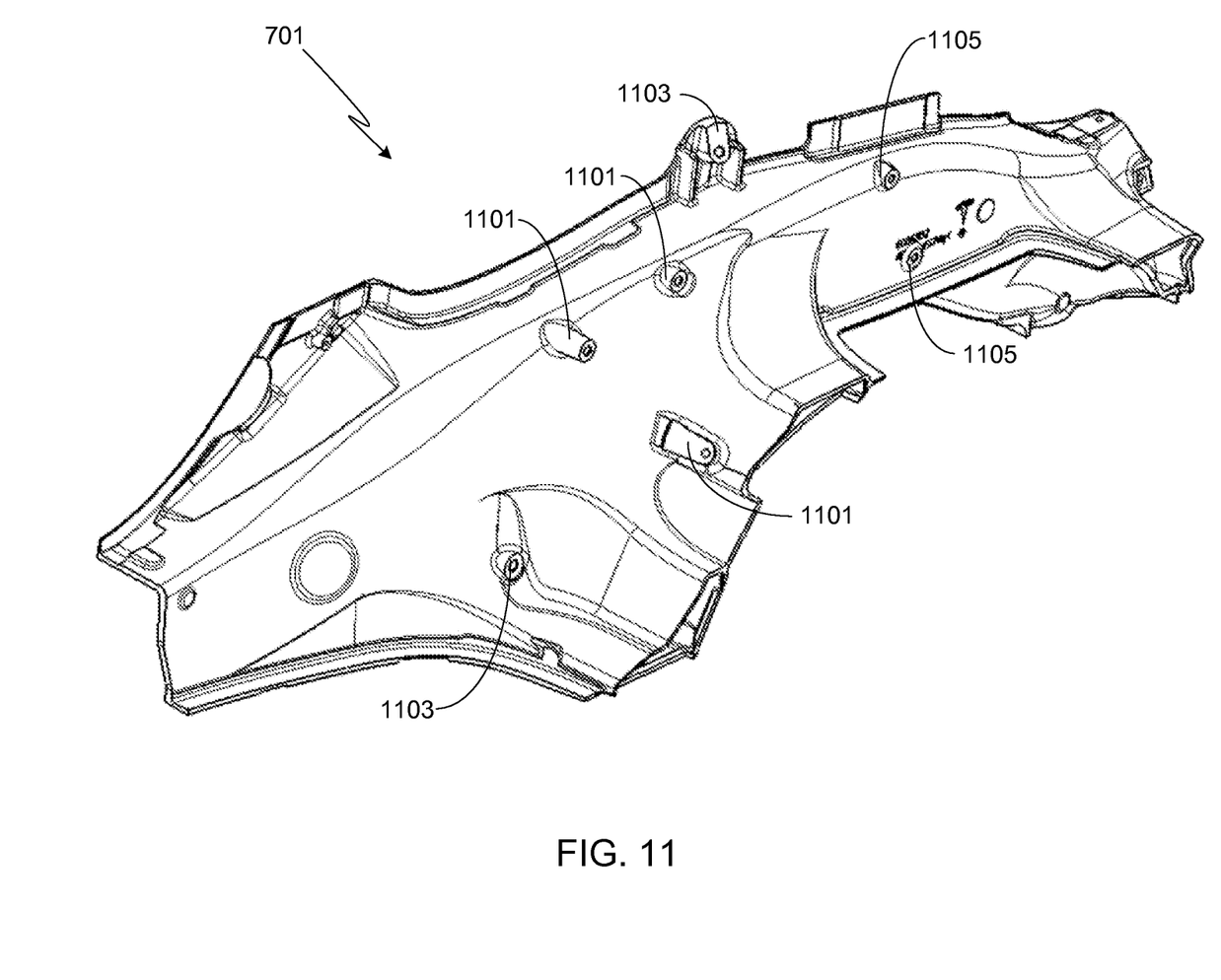
FIG. 11 provides a detailed, perspective view of the single piece rear torque box of the invention.

FIG. 11 provides a detailed, perspective view of rear torque box 701. As previously noted, the torque box of the invention is a single piece unit that couples the side sills to the rear rails, thus providing an improved load path for rear impact loads. Preferably torque box 701 is fabricated from aluminum using a casting technique (e.g., low pressure permanent mold with internal sand core), although other materials (e.g., aluminum alloy, steel, etc.) and fabrication techniques may be used. In the illustrated embodiment, in addition to providing a single component for attaching the rear structural components, the rear torque boxes also provide multiple attachment points for the rear vehicle seats. Directly attaching the seat(s) and/or seat belts to the rear torque boxes improves seat mount rigidity and strength, thereby enhancing passenger safety. In the illustrated embodiment, the rear seat bench assembly is attached to the rear torque boxes at attachment points 1101. The seat belts for the rear seat are attached to the rear torque boxes at attachment points 1103. Additionally, this embodiment is configured to attach a third row seat to the torque boxes at attachment points 1105.

Figure 12:
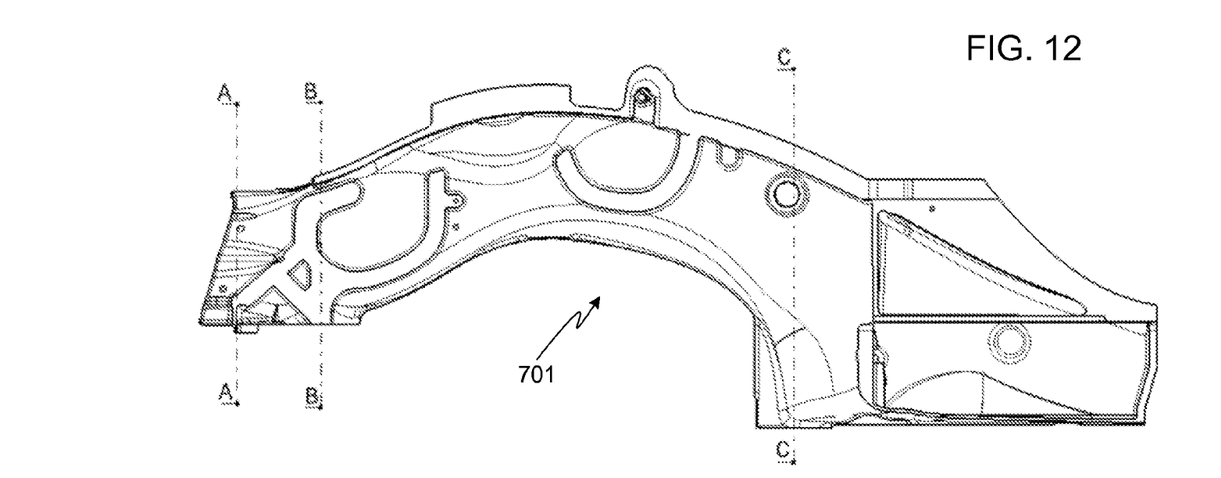
FIG. 12 provides an outer, side view of the single piece rear torque box shown in FIG. 11.
Figure 13:
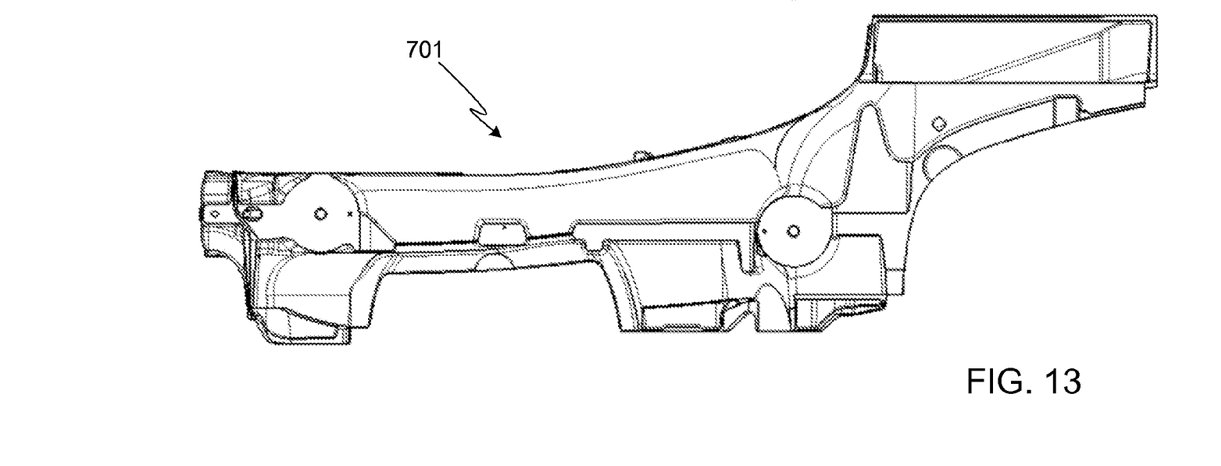
FIG. 13 provides a bottom view of the single piece rear torque box shown in FIG. 11.
Figure 14:
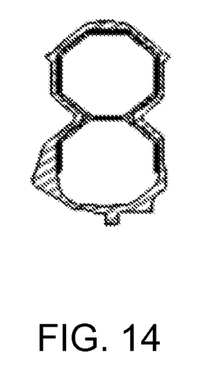
FIG. 14 provides a cross-sectional view along plane A-A of the torque box shown in FIG. 12.
Figure 15:
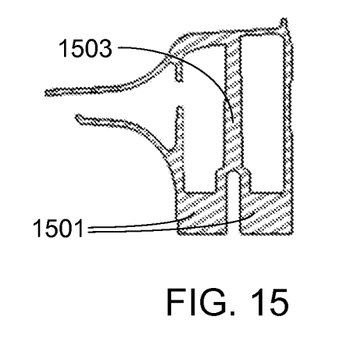
FIG. 15 provides a cross-sectional view along plane B-B of the torque box shown in FIG. 12.
Figure 16:
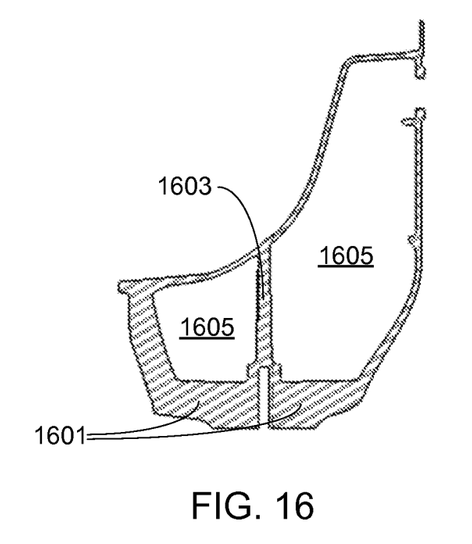
FIG. 16 provides a cross-sectional view along plane C-C of the torque box shown in FIG. 12.

In order to achieve the desired stiffness, preferably a hollow casting design is used with torque box 701, thus allowing the inclusion of internal ribs as well as variable thickness walls. This aspect of the torque box is illustrated in FIGS. 12-16. FIG. 12 provides an outer, side view (i.e., looking towards the vehicle centerline) of torque box 701 while FIG. 13 provides a bottom view of torque box 701. FIGS. 14-16 provide cross-sectional views of torque box 701 taken at planes A-A, B-B, and C-C, respectively. The cross-sectional views clearly illustrate the variable thickness walls as well as the ribs (e.g., ribs 1501 and 1601) and bosses (e.g., boss 1503 and 1603) of the torque box. The large cavities within the torque box (e.g., cavities 1605 in FIG. 16) allow component weight to be minimized while still achieving the desired component strength and stiffness.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. A rear structure of a vehicle comprising:
   a pair of rear torque boxes, said pair of rear torque boxes comprising a first rear torque box and a second rear torque box, wherein each of said rear torque boxes is comprised of a single piece;

a pair of rocker panels, said pair of rocker panels comprising a left hand rocker panel and a right hand rocker panel, wherein said first rear torque box is mechanically coupled to said left hand rocker panel and said second rear torque box is mechanically coupled to said right hand rocker panel;

a pair of rear rails, wherein said pair of rear rails are spaced apart in a widthwise direction relative to said vehicle, wherein each of said pair of rear rails extend in a lengthwise direction relative to said vehicle, wherein said pair of rear rails comprise a left hand rear rail and a right hand rear rail, wherein said first rear torque box is mechanically coupled to a first end portion of said left hand rear rail and said second rear torque box is mechanically coupled to a first end portion of said right hand rear rail, wherein a second end portion of said left hand rear rail distal from said first end portion of said left hand rear rail is mechanically coupled to a rear bumper assembly and wherein a second end portion of said right hand rear rail distal from said first end portion of said right hand rear rail is mechanically coupled to said rear bumper assembly, wherein each of said pair of rear rails including said first and second end portions is comprised of a polygonal-shaped upper hollow channel and a polygonal-shaped lower hollow channel, and wherein said polygonal-shaped upper hollow channel and said polygonal-shaped lower hollow channel share a common wall; and at least one cross-member interposed between said first rear torque box and said second rear torque box, wherein said at least one cross-member is mechanically coupled to both said first rear torque box and said second rear torque box.

2. The rear structure of claim 1, wherein said first rear torque box is welded to said left hand rocker panel and said second rear torque box is welded to said right hand rocker panel, wherein said first rear torque box is welded to said first end portion of said left hand rear rail and said second rear torque box is welded to said first end portion of said right hand rear rail, and wherein said at least one cross-member is welded to both said first rear torque box and said second rear torque box.

3. The rear structure of claim 1, wherein said first and second rear torque boxes are cast.

4. The rear structure of claim 3, wherein said first and second rear torque boxes are cast with a low pressure permanent mold and an internal sand core.

5. The rear structure of claim 1, wherein said first and second rear torque boxes are comprised of a material selected from the group of materials consisting of aluminum, aluminum alloys and steel.

6. The rear structure of claim 1, wherein said polygonal-shaped upper hollow channel and said polygonal-shaped lower hollow channel of said left hand rear rail and said polygonal-shaped upper hollow channel and said polygonal-shaped lower hollow channel of said right hand rear rail each utilize an octagon-shaped structure.

7. The rear structure of claim 1, wherein said polygonal-shaped upper hollow channel and said polygonal-shaped lower hollow channel of said left hand rear rail and said polygonal-shaped upper hollow channel and said polygonal-shaped lower hollow channel of said right hand rear rail each utilize a hexagon-shaped structure.

8. The rear structure of claim 1, wherein each of said pair of rear rails is comprised of a material selected from the group consisting of aluminum extrusions, aluminum alloy extrusions and steel extrusions.

9. The rear structure of claim 1, wherein said left hand rear rail and said right hand rear rail each have a cross-sectional height and a cross-sectional width, wherein said cross-sectional height is at least twice said cross-sectional width.

10. The rear structure of claim 1, wherein said rear bumper assembly further comprises a rear vehicle body panel.

11. The rear structure of claim 1, wherein said rear bumper assembly further comprises a rear vehicle bumper.

12. The rear structure of claim 1, further comprising a battery pack enclosure mounted under said vehicle, said battery pack enclosure comprising an enclosure top panel, an enclosure bottom panel, and a plurality of enclosure side members, wherein said battery pack enclosure is configured to hold a plurality of batteries, said battery pack enclosure mounted between and mechanically coupled to said left hand rocker panel and said right hand rocker panel, wherein said battery pack enclosure is mounted under a passenger cabin floor panel, wherein said battery pack enclosure further comprises a plurality of battery pack cross-members integrated into said battery pack enclosure, wherein each of said plurality of battery pack cross-members transverses the distance between a first enclosure side member adjacent to said left hand rocker panel and a second enclosure side member adjacent to said right hand rocker panel, and wherein said plurality of battery pack cross-members segregate said plurality of batteries into groups of batteries.

13. The rear structure of claim 12, wherein said enclosure bottom panel, said enclosure top panel, and said plurality of enclosure side members are each fabricated from a material selected from the group of materials consisting of aluminum, aluminum alloys and steel.

14. The rear structure of claim 12, wherein said plurality of enclosure side members further comprise a mounting flange that is mechanically coupled to said left hand rocker panel and said right hand rocker panel using a plurality of bolts.

15. The rear structure of claim 12, wherein said enclosure bottom panel is attached to said plurality of enclosure side members by one of welding, brazing, soldering or bonding, and wherein said enclosure top panel is bolted to said plurality of enclosure side members.

16. The rear structure of claim 12, wherein said battery pack enclosure is substantially airtight.

17. The rear structure of claim 1, wherein said left hand rocker panel and said right hand rocker panel pair are each comprised of a material selected from the group consisting of aluminum extrusions, aluminum alloy extrusions and steel extrusions.

18. The rear structure of claim 1, wherein said first rear torque box and said second rear torque box each further comprise a plurality of integral vehicle seat mounts.

* * * * *